(12) United States Patent
Greenstien

(10) Patent No.: US 11,573,113 B2
(45) Date of Patent: Feb. 7, 2023

(54) INTEGRATED CONTAINER LID AND MEASURING APPARATUS

(71) Applicant: Darren Christopher Greenstien, Barrhead (CA)

(72) Inventor: Darren Christopher Greenstien, Barrhead (CA)

(*) Notice: Subject to any disclaimer, the term of this patent is extended or adjusted under 35 U.S.C. 154(b) by 176 days.

(21) Appl. No.: 17/178,655

(22) Filed: Feb. 18, 2021

(65) Prior Publication Data
US 2022/0260404 A1    Aug. 18, 2022

(51) Int. Cl.
*G01F 19/00* (2006.01)
*B65D 51/24* (2006.01)
*B65D 41/26* (2006.01)

(52) U.S. Cl.
CPC ............ *G01F 19/00* (2013.01); *B65D 41/26* (2013.01); *B65D 51/245* (2013.01)

(58) Field of Classification Search
CPC ........ G01F 19/00; B65D 41/26; B65D 51/245
See application file for complete search history.

(56) References Cited

U.S. PATENT DOCUMENTS

| | | | | |
|---|---|---|---|---|
| 3,101,751 | A * | 8/1963 | Ballin | B01L 3/0282 422/934 |
| 8,171,963 | B2 * | 5/2012 | Sonnier | G01F 11/027 141/26 |
| 9,625,434 | B2 * | 4/2017 | Dervaes | B05B 15/30 |
| 2009/0178725 | A1 * | 7/2009 | Sonnier | G01F 11/027 141/346 |
| 2011/0203368 | A1 * | 8/2011 | Zhang | G01F 19/00 73/426 |

FOREIGN PATENT DOCUMENTS

| CN | 210036866 U | * | 2/2020 | |
|---|---|---|---|---|
| JP | 2001031147 A | * | 2/2001 | ......... B65D 81/3216 |
| WO | WO-2020049501 A1 | * | 3/2020 | ............. B65D 41/04 |

* cited by examiner

*Primary Examiner* — Jamel E Williams
(74) *Attorney, Agent, or Firm* — Orin Del Vecchio

(57) ABSTRACT

An integrated lid and measuring apparatus that is configured to be releasably secured to an opening of a container wherein the present invention provides a technique of transferring liquid from the container and provide measuring thereof. The integrated lid and measuring apparatus includes a lid portion and a measuring portion that are integrally formed utilizing a suitable technique. The measuring portion is superposed the lid portion. The lid portion is configured to secure to an opening of a container in two alternate manners. The lid portion includes an inner sealing member that has a siphon member sealably connected therewith that extends into the interior volume of the container. The measuring portion has a body having six walls wherein each wall has a view window formed therein. Adjacent each view window is measuring indicia wherein the present invention has different measuring indicia adjacent each view window.

12 Claims, 1 Drawing Sheet

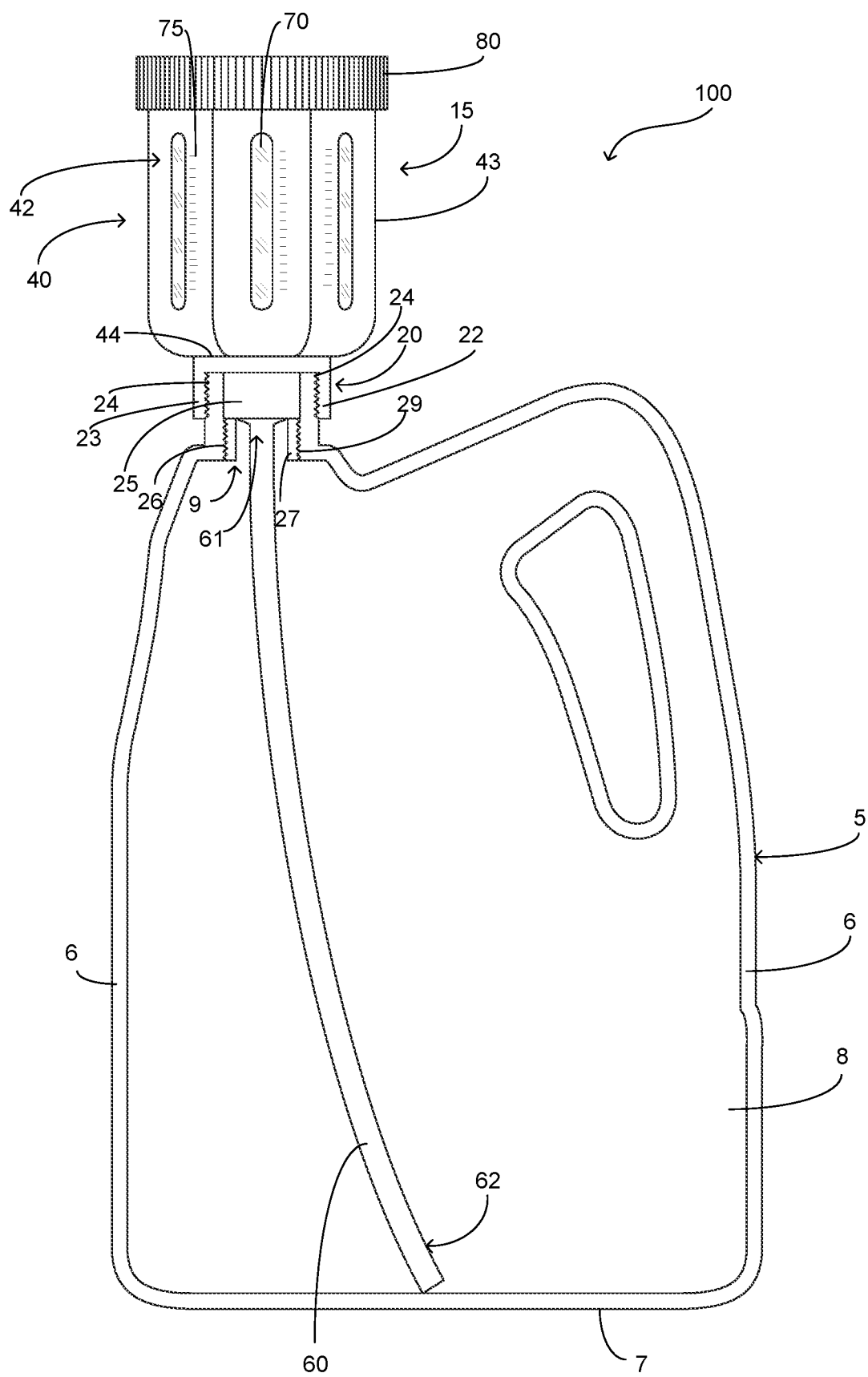

INTEGRATED CONTAINER LID AND MEASURING APPARATUS

FIELD OF THE INVENTION

The present invention relates generally to measuring devices, more specifically but not by way of limitation, a lid configured to secure onto a gallon container or a container similar thereto, wherein the lid further includes a measuring apparatus so as to facilitate measuring a portion of a liquid disposed within the container and transferred to the measurement member of the present invention.

BACKGROUND

There are numerous types of fluids that are provided in containers such as but not limited to one gallon containers wherein only a small portion of the fluid is utilized at a time. By way of example but not limitation, two stroke engine oil which is utilized to blend into fuel for a two-stroke combustible motor is typically blended into a volume of gasoline wherein a user may only need a few ounces at a time. When consuming only a small amount of the fluid from a container, it is common for a user to need to measure how much fluid is removed from the container in order to ensure a correct ratio when blending with another fluid such as gasoline.

Various implements are utilized to measure a portion of a liquid from a larger container and these implements can include a smaller calibrated container or implements such as measuring cups. Utilizing the aforementioned devices can present challenges in regards to accuracy as well as these conventional devices may not be readily available or convenient to use. Additionally, transfer of the fluid to conventional measuring implements can sometimes result in spillage or loss of the fluid.

Accordingly, there is a need for a container lid having an integrated measuring apparatus wherein the present invention provides a technique to remove a portion of fluid from a storage container and provide precise measuring thereof.

SUMMARY OF THE INVENTION

It is the object of the present invention to provide a container lid having an integrated measuring member configured to provide measurement of fluid disposed within the container wherein the present invention includes an integrally formed lid member and measurement member.

Another object of the present invention is to provide a lid having an integrated measurement member and lid member wherein the lid member includes an inner and outer portion operable to provide a first and second method to sealably couple to a container.

A further object of the present invention is to provide a container lid having an integrated measuring member configured to provide measurement of fluid disposed within the container wherein the lid member has operably coupled thereto a siphon member that extends into the interior volume of the container.

Still another object of the present invention is to provide a lid having an integrated measurement member and lid member wherein the measurement member is superposed the upper surface of the lid member.

An additional object of the present invention is to provide a container lid having an integrated measuring member configured to provide measurement of fluid disposed within the container wherein the measurement member has a plurality of view windows calibrated to provide alternate options of volumes.

Yet a further object of the present invention is to provide a lid having an integrated measurement member and lid member wherein the measurement member further includes a top operable to seal the interior volume thereof.

Another object of the present invention is to provide a container lid having an integrated measuring member configured to provide measurement of fluid disposed within the container wherein the siphon member facilitates transfer of fluid from the interior volume of the container to the interior volume of the measurement member.

An alternate object of the present invention is to provide a lid having an integrated measurement member and lid member wherein the measurement member can be provided in alternate shapes and sizes.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

FIG. 1 is a side diagrammatic view of a preferred embodiment of the present invention.

DETAILED DESCRIPTION

Referring now to the drawings submitted herewith, wherein various elements depicted therein are not necessarily drawn to scale and wherein through the views and figures like elements are referenced with identical reference numerals, there is illustrated an integrated lid and measuring apparatus 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring to the Figures herein, the integrated lid and measuring apparatus 100 includes a container 5. The container 5 includes walls 6 and a bottom 7 integrally formed to create an interior volume 8. The container 5 in a preferred embodiment is manufactured from a suitable durable material such as but not limited to plastic. It should be understood within the scope of the present invention that the container 5 could be provided in alternate sizes and shapes.

Releasably secured to the container 5 at the opening 9 thereof is the measurement member 15. The measurement member 15 includes a lid portion 20 and a measuring portion 40 wherein the lid portion 20 and measuring portion 40 are integrally formed utilizing suitable techniques. The lid portion 20 includes outer leg sections 22, 23 wherein the outer leg sections 22, 23 have threads 24 formed on the inner surface thereof. The threads 24 provide a technique to releasably secure the measurement member 15 to the container 5 but it should be understood within the scope of the present invention that alternate elements could be utilized to releasably secure the lid portion 20 to the container 5.

The lid portion 20 further includes inner sealing member 25 and inner leg sections 26, 27. The inner sealing member 25 is manufactured from a material such as but not limited to rubber. The inner sealing member 25 is annular in shape and is designed to provide a substantially hermetic seal between the lid portion 20 and the opening 9 of the container 5. The inner sealing member 25 is manufactured of a diameter that is just slightly larger than the diameter of the opening 9 so during coupling of the lid portion 20 to the container 5 an effective seal is created. Adjacent to the inner sealing member 25 are the inner leg sections 26, 27. In a preferred embodiment of the present invention the lid portion 20 is designed to releasably couple to containers having alternate arrangements for the opening 9 wherein the opening 9 may be configured with inner threads or outer threads. The lid portion 20 is configured to be releasably secured to either configuration. The inner leg sections 26, 27 have threads disposed on the outer surface thereof so as to releasably secure to a container that may have threads disposed on the inner portion of the opening 9. While an embodiment of the lid portion 20 has been illustrated and discussed herein, it should be understood within the scope of the present invention that the lid portion 20 could be configured in alternate manners in order to achieve the desired objective of being able to releasably secure to a container.

The integrated lid and measuring apparatus 100 further includes a siphon member 60. The siphon member 60 functions to transfer fluid disposed within the interior volume 8 of the container 5. The siphon member 60 includes a first end 61 and second end 62 wherein the second end 62 is proximate the bottom 7. First end 61 is sealably connected to the inner sealing member 25. In operation of the integrated lid and measuring apparatus 100 a user will apply pressure to the walls 6 of the container 5 and fluid disposed within the interior volume 8 will transfer from the interior volume 8 to the measuring portion 40 via the siphon member 60. The siphon member 60 is tubular and hollow and is manufactured from a suitable material such as but not limited to plastic.

The measuring portion 40 of the integrated lid and measuring apparatus 100 is integrally formed with the lid portion 20 and superposed thereto. The measuring portion 40 includes a body 42 wherein the body 42 has walls 43 and a bottom 44 forming an interior volume. The measuring portion 40 is manufactured from a suitable durable material such as but not limited to plastic. The body 42 in its preferred embodiment is hexagonal in shape. Formed in the walls 43 of the body 42 are a plurality of view windows 70. The view windows 70 are transparent and are operable to permit viewing of the amount of fluid being transferred into the interior volume of the body 42. Each view window 70 includes measuring indicia 75 adjacent thereto. As the body 42 has six view windows as a result of the hexagonal shape, each of the view windows 70 has an alternate type of measuring indicia 75. It should be understood within the scope of the present invention that the measuring indicia 75 ranges broadly to include measurements such as but not limited to fluid ounces, milliliters and mixing ratios for gasoline. While the preferred embodiment of the body 42 is hexagonal in shape, it should be understood within the scope of the present invention that the body 42 could be formed in alternate shapes having less than or more than six walls.

Secured to the upper end of the measuring portion 40 is cap 80. The body 42 is adapted in form proximate the upper end thereof so as to receive an annular shaped cap 80 wherein the cap 80 is operable to seal the interior volume of the body 42. It should be understood within the scope of the present invention that the measuring portion 40 could be sealed at the upper end of the body 42 utilizing alternate suitable techniques and/or elements.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. An integrated lid and measuring apparatus that is configured to be releasably secured to a container wherein the integrated lid and measuring apparatus comprises:
   a lid portion, said lid portion being mateably shaped to an opening of the container, said lid portion having an inner sealing member, said inner sealing member operable to hermetically seal to the opening of the container;

a measuring portion, said measuring portion having a body wherein the body includes a plurality of walls and a bottom forming an interior volume, wherein each of said plurality of walls having a view window formed therein, said measuring portion being integrally formed with said lid portion and being superposed thereto; and a siphon member, said siphon member having a first end and a second end, said siphon member being sealably coupled to said inner sealing member proximate said first end of said siphon member, said second end of said siphon member extending into the container.

2. The integrated lid and measuring apparatus as recited in claim 1, wherein said lid portion further includes outer leg sections, said outer leg sections extending downward, said outer leg section having threads formed thereon so as to mateably couple with threads on the opening of the container.

3. The integrated lid and measuring apparatus as recited in claim 2, wherein said body of said measuring portion further includes measuring indicia, said measuring indicia being adjacent said view windows.

4. The integrated lid and measuring apparatus as recited in claim 3, and further including inner leg sections, said inner leg sections being formed with said lid portion extending downward therefrom, said inner leg sections being adjacent said inner sealing member, said inner leg sections having threads formed on an outer surface thereof.

5. The integrated lid and measuring apparatus as recited in claim 4, wherein said measuring portion further includes a cap, said cap configured to be releasably secured to an upper end of said measuring portion.

6. The integrated lid and measuring apparatus as recited in claim 5, wherein the measuring indicia is configured to provide a plurality of alternate measuring units.

7. An integrated lid and measuring apparatus releasably secured to a container that is configured to provide measuring of a fluid using a plurality of alternate volume measurements wherein the integrated lid and measuring apparatus comprises:

a lid portion, said lid portion being annular in shape, said lid portion having an upper surface, said lid portion having an inner sealing member wherein said inner sealing member is formed on an inner surface of said lid portion and extends downward therefrom, said inner sealing member configured to hermetically seal to an opening of the container, said lid portion having outer leg sections, said outer leg sections extending downward from said upper surface, said outer leg sections having threads formed on an inner surface thereof;

a measuring portion, said measuring portion being superposed the upper surface of said lid portion, said measuring portion being integrally formed with said lid portion, said measuring portion having a body wherein the body is hexagonal in shape having six walls and a bottom forming an interior volume, said body having an upper end and a lower end, said body having an opening proximate said upper end, wherein each of said six walls having a view window formed therein; and a siphon member, said siphon member having a first end and a second end, said siphon member being sealably coupled to said inner sealing member proximate said first end of said siphon member, said second end of said siphon member extending into the container.

8. The integrated lid and measuring apparatus as recited in claim 7, wherein said lid portion further includes inner leg sections, said inner leg sections being adjacent said inner sealing member, said inner leg sections being located inward on said lid portion with respect to said outer leg sections, said inner leg sections having threads formed on an outer surface thereof.

9. The integrated lid and measuring apparatus as recited in claim 8, wherein said body of said measuring portion further includes measuring indicia, said measuring indicia being adjacent said six view windows.

10. The integrated lid and measuring apparatus as recited in claim 9, wherein the measuring indicia is configured to provide a plurality of alternate measuring units.

11. The integrated lid and measuring apparatus as recited in claim 10, wherein said measuring portion further includes a cap, said cap configured to be releasably secured to an upper end of said measuring portion.

12. The integrated lid and measuring apparatus as recited in claim 11, wherein said inner sealing member has a diameter that is larger than that of an opening of the container to which the integrated lid and measuring apparatus is secured.

* * * * *